United States Patent
Crocker et al.

(10) Patent No.: US 7,336,943 B2
(45) Date of Patent: Feb. 26, 2008

(54) ESTABLISHING MOBILE TERMINATED CONNECTIONS WITH DYNAMICALLY ASSIGNED WIRELESS IP TERMINALS IN AUTOMOTIVE TELEMATICS APPLICATIONS

(75) Inventors: Dwayne A. Crocker, Oxford, MI (US); Andrew J. Gryc, West Bloomfield, MI (US); Mark J. Glaza, Warren, MI (US); John J. Correia, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 739 days.

(21) Appl. No.: 10/716,861

(22) Filed: Nov. 19, 2003

(65) Prior Publication Data

US 2005/0105509 A1    May 19, 2005

(51) Int. Cl.
*H04M 3/42* (2006.01)

(52) U.S. Cl. .............................. 455/414.1; 455/575.9
(58) Field of Classification Search ............ 455/414.1, 455/569.2; 701/1, 29; 370/352
See application file for complete search history.

(56) References Cited

U.S. PATENT DOCUMENTS

| 7,092,799 B2* | 8/2006 | Oesterling et al. ............ 701/1 |
| 2002/0032042 A1* | 3/2002 | Poplawsky et al. ......... 455/564 |
| 2004/0203672 A1* | 10/2004 | Crocker et al. ............ 455/415 |
| 2005/0080606 A1* | 4/2005 | Ampunan et al. ............ 703/8 |

* cited by examiner

*Primary Examiner*—Creighton Smith

(57) ABSTRACT

The invention provides a method for obtaining an internet connection. The method provides for sending an internet connection request from a call center to a vehicle telematics unit and for providing an IP address and server call in parameters to the vehicle telematics unit. The method also receives an internet connection at the provided IP address with the server call in parameters from the telematics unit at the call center.

16 Claims, 4 Drawing Sheets

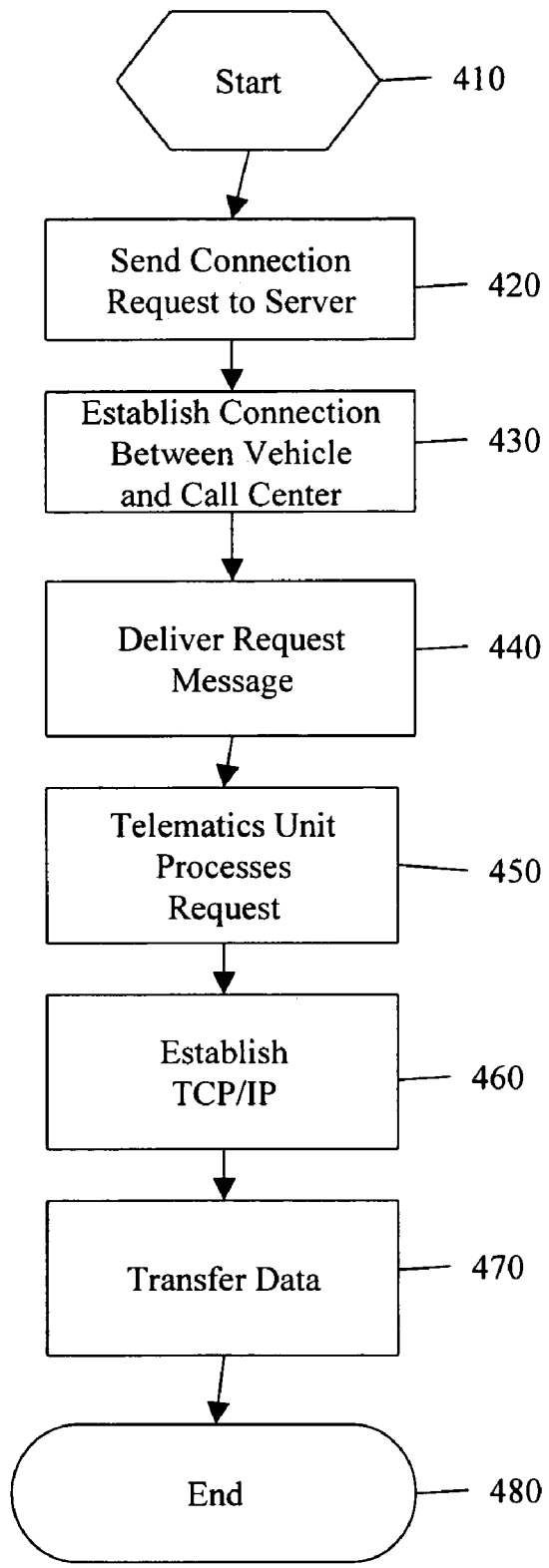

ESTABLISHING MOBILE TERMINATED CONNECTIONS WITH DYNAMICALLY ASSIGNED WIRELESS IP TERMINALS IN AUTOMOTIVE TELEMATICS APPLICATIONS

FIELD OF THE INVENTION

This invention relates generally to establishing internet connections between a telematics unit and an internet provider. In particular, this invention relates to a method for establishing mobile terminated connections with dynamically assigned wireless IP terminals in automotive telematics applications.

BACKGROUND OF THE INVENTION

As Transmission Control Protocol/Internet Protocol (TCP/IP) (also referred to as packet data) connectivity over wireless wide area networks (WANs) continues to expand, mobile anytime, anywhere access to the Internet capabilities continue to become commonplace. The ability of such data transmission offers many advantages, including greater throughput and standardized protocol architectures. In addition to mobile Internet access, packet data enables implementation of many applications. For example, automotive telematics enable applications that usually require large amounts of data to be transferred to or from the vehicle such as: navigation route data, downloading new applications, and remotely re-flashing of vehicle control modules.

Applications that utilize this TCP/IP connectivity in mobile vehicles are usually divided between two categories: Mobile Terminated (MT) and Mobile Originated (MO). Wireless packet data networks have been optimized for MO connections, due to a typical case of a user initiating a mobile connection from a mobile terminal.

However, wireless packet data networks typically provide only a dynamically assigned IP address to the mobile terminal. This is a result of mobile users usually initiating only temporary connections to the Internet as well as limitations in current protocol standard (Ipv4) address space limit on the number of IP addresses available to wireless carriers. While static IP addresses may be allocated, they are usually costly and inefficient within the current framework.

These limitations present a problem for telematics applications that are initiated outside of the vehicle and require a mobile terminated connection. A factor affecting the viability of MT wireless packet data connectivity is that the physical medium for the data is wireless and not always available. A mobile terminal can only transmit TCP/IP data after the wireless carrier system has assigned specific physical channels for data transmission. After a period of inactivity the network may automatically reassign the channels to other packet data users and the terminal may fall into a dormant state where instantaneous data transfer is no longer possible and the terminal must again request resources for data transfer. Even when a terminal is assigned a static IP address, making a MT connection with that terminal while in a dormant state, where no physical radio channel is assigned for data transfer, is not always successful.

Accordingly, it would be desirable to have a method to establish mobile terminated connections to the Internet that overcomes the above disadvantages.

SUMMARY OF THE INVENTION

One aspect of the present invention provides a method for obtaining an internet connection. The method comprises sending an internet connection request from a call center to a vehicle telematics unit and providing an IP address and server call in parameters to the vehicle telematics unit. The method further comprises receiving an internet connection at the provided IP address with the server call in parameters from the telematics unit at the call center.

Another aspect of the present invention provides a computer usable medium including a computer readable program for obtaining an internet connection. The computer usable medium comprises computer readable program code for sending an internet connection request from a call center to a vehicle telematics unit and for providing an IP address and server call in parameters to the vehicle telematics unit. The computer usable medium also comprises computer readable program code for receiving an internet connection at the provided IP address with the server call in parameters from the telematics unit at the call center.

Another aspect of the present invention provides a system for obtaining an internet connection. The system comprises means for sending an internet connection request from a call center to a vehicle telematics unit and for providing an IP address and server call in parameters to the vehicle telematics unit. The system also provides means for receiving an internet connection at the provided IP address with the server call in parameters from the telematics unit at the call center.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 is a flow chart of another method for establishing a mobile terminated connection with dynamically assigned wireless IP terminals in automotive telematics applications in accordance with one embodiment of the present invention.

DETAILED DESCRIPTION OF THE FIGURES

Figure 1:
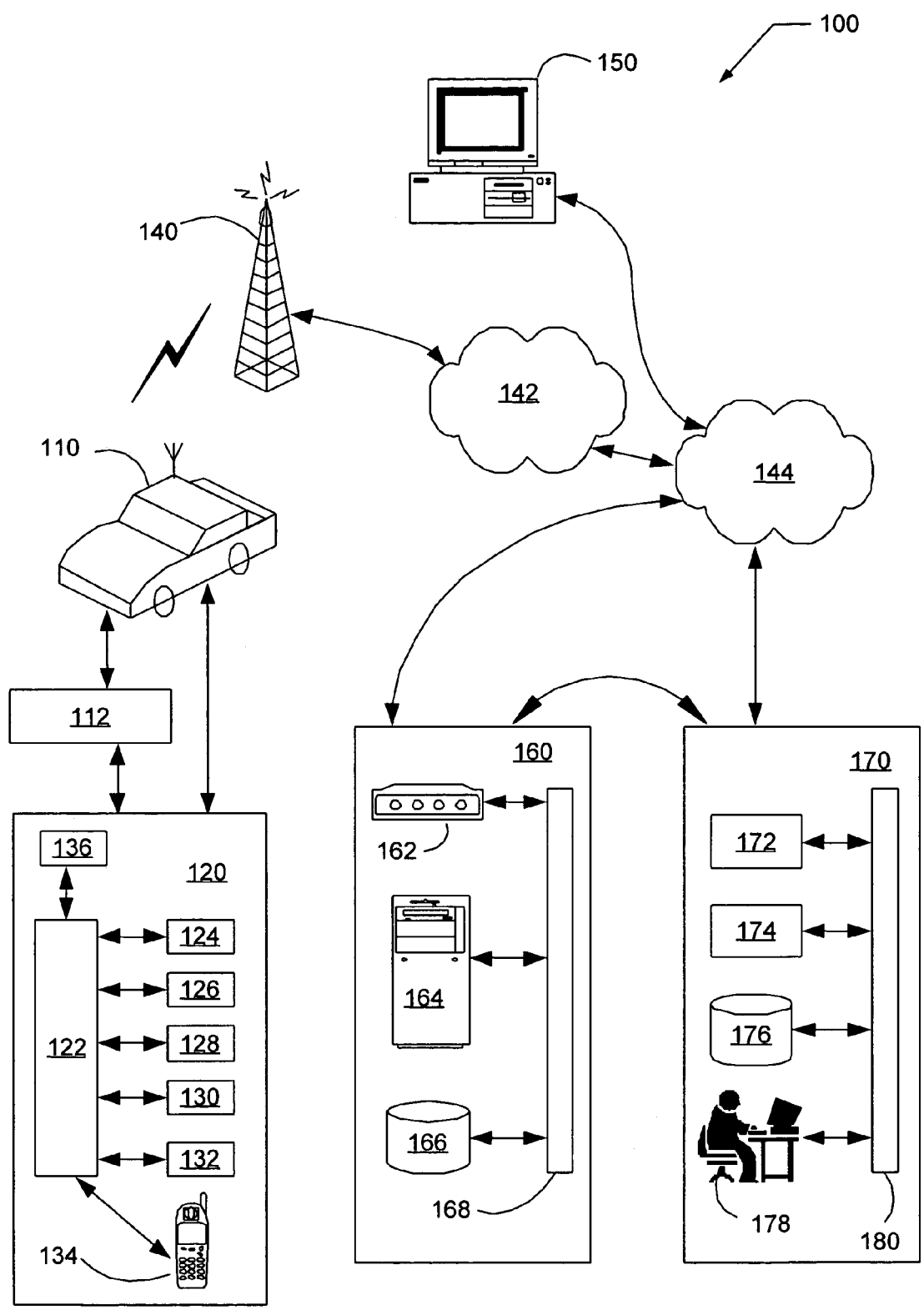
FIG. 1 is a block diagram illustrating an operating environment in accordance with one embodiment of the present invention.

FIG. 1 is an illustrative operating environment for an embodiment of the present invention. FIG. 1 shows a mobile vehicle communication system (MVCS) 100. Mobile vehicle communication system 100 includes mobile vehicle 110, vehicle communication bus 112, vehicle communications unit (VCU) 120, one or more wireless carrier systems 140, one or more communication networks 142, one or more land networks 144, one or more client, personal or user computers 150, one or more web-hosting portals 160, and one or more call centers 170. In one embodiment, mobile vehicle 110 is implemented as a mobile vehicle equipped with suitable hardware and software for transmitting and receiving voice and data communications.

In an embodiment, VCU 120 is a telematics unit that includes a digital signal processor (DSP) 122 connected to a wireless modem 124, a global positioning system (GPS) unit 126, an in-vehicle memory 128, a microphone 130, one or more speakers 132, an embedded or in-vehicle mobile phone 134, and a vehicle communications platform (VCP) 136. DSP 122 is also referred to as a microcontroller, controller, host processor, ASIC, or vehicle communications processor. GPS unit 126 provides longitude and latitude coordinates of the vehicle, as well as a time stamp and a date stamp. In-vehicle mobile phone 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. The mobile telephone system is a digital mobile telephone system operating over a prescribed band nominally at 800 MHz, 900 MHz, 1900 MHz, or any suitable band capable of carrying mobile communications. Examples of such digital mobile telephone systems include code division multiple access (CDMA) (e.g. IS-95), Global System for Mobile Communications (GSM), Frequency Division Multiple Access (FDMA), and time division multiple access (TDMA).

DSP 122 executes various computer programs that control programming and operational modes of electronic and mechanical systems within mobile vehicle 110. DSP 122 controls communications between VCU 120, wireless carrier system 140, and call center 170. In one embodiment, the DSP 122 manages communication channels and transmission of data through the VCP 136. In one embodiment, a speech-recognition application is installed in DSP 122 to translate human speech input through microphone 130 into digital signals. DSP 122 generates and accepts digital signals transmitted between VCU 120 and a vehicle communication bus 112 that is connected to various electronic modules in the vehicle 110. In one embodiment, the digital signals activate the programming mode and operation modes, as well as provide for data transfers. In this embodiment, signals from DSP 122 are translated into voice or speech messages and sent out through speaker 132.

Mobile vehicle 110, via a vehicle communication bus 112, sends signals to various units of equipment and systems within mobile vehicle 110 to perform various functions such as unlocking a door, opening the trunk, setting personal comfort settings, and calling from VCU 120. In facilitating interactions among the various communication and electronic modules, vehicle communication bus 112 utilizes bus interfaces such as controller-area network (CAN), International Organization for Standardization (ISO) Standard 9141, ISO Standard 11898 for high-speed applications, J1850, and ISO Standard 11519 for lower speed applications.

Mobile vehicle 110, via VCU 120, sends and receives radio transmissions from wireless carrier system 140. Mobile vehicle 110 may be in communication with one or more wireless carrier systems 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS). In another example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier uses services compliant with other standards, such as, for example, IEEE 802.11 compliant systems, Bluetooth systems, and the like.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144.

Land network 144 is a public-switched telephone network (PSTN). Mobile vehicle 110 may be in communication with one or more land networks 144. In one embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or user computer 150 sends data to web-hosting portal through a web-page interface using communication standards such as hypertext transport protocol (HTTP), and transport-control protocol Internet protocol (TCP/IP). In one embodiment, the data includes vehicle data such as user preferences and selections and operational modes of electronic and mechanical systems within mobile vehicle 110. In operation, a driver utilizes user computer 150 to initiate setting or re-setting of user-preferences for mobile vehicle 110. Various vehicle data from client-side software is transmitted to server-side software of web-hosting portal 160. Other vehicle data is stored at web-hosting portal 160.

Web-hosting portal 160 includes one or more data modems 162, one or more web servers 164, one or more databases 166, and a network 168. Web-hosting portal 160 is connected, in one embodiment, directly by wire to call center 170, or connected by phone lines to land network 144, which is connected to call center 170. Web-hosting portal 160 is connected to land network 144 by one or more data modems 162. Land network 144 sends digital data to and from modem 162, and this data is subsequently transferred to web server 164. In one embodiment, modem 162 resides inside web server 164. Land network 144 transmits data communications between web-hosting portal 160 and call center 170.

Web server 164 receives data from user computer 150 via land network 144. In alternative embodiments, user computer 150 includes a wireless modem to send vehicle data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive vehicle data from user computer 150 to VCU 120 in mobile vehicle 110. Web server 164 sends to or receives data transmissions from one or more databases 166 via network 168. Web server 164 includes computer applications and files for managing vehicle data and generating targeted data.

In one embodiment, one or more web servers 164 are networked via network 168 to distribute vehicle data among its network components such as database 166. In an example, database 166 is a part of or a separate computer from web server 164. Web server 164 sends data transmissions to call center 170 via modem 162, and through land network 144.

Call center 170 is a location where many calls are received and serviced at the same time, or where many calls are sent at the same time. In one embodiment, the call center is a telematics call center, facilitating communications to and from VCU 120 in mobile vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network 180.

Switch 172 of call center 170 connects to land network 144. Switch 172 transmits voice or data transmissions from call center 170, and receives voice or data transmissions from VCU 120 in mobile vehicle 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network 180.

Communication services manager 174 is any suitable hardware and software capable of providing communication services to VCU 120 in mobile vehicle 110. Communication services manager 174 sends to or receives data transmissions from one or more communication services databases 176 via network 180. Communication services manager 174 sends to or receives data transmissions from one or more communication services advisors 178 via network 180. Communication services database 176 sends to or receives data transmissions from communication services advisor 178 via network 180. Communication services advisor 178 receives from or sends to switch 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and vehicle data management services. Communication services manager 174 receives service requests for services from a user via user computer 150, web-hosting portal 160, and land network 144. Communication services manager 174 transmits and receives vehicle data to VCU 120 in mobile vehicle 110 through wireless carrier system 140, communication network 142, land network 144, voice and data switch 172, and network 180. Communication services manager 174 stores or retrieves vehicle data and information from communication services database 176. Communication services manager 174 may provide requested information to communication services advisor 178.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via VCU 120. In another example, a virtual advisor is implemented as a synthesized voice interface responding to requests from VCU 120 in mobile vehicle 110.

Communication services advisor 178 provides services to VCU 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with VCU 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 initiates service requests to call center 170 by sending a voice or digital-signal command to VCU 120 which in turn, sends an instructional signal or a voice call through wireless modem 124, wireless carrier system 140, communication network 142, and land network 144 to call center 170. In another embodiment, the service request is for a vehicle data upload. In yet another embodiment, the mobile vehicle 110 receives a request from call center 170 to send various vehicle data from mobile vehicle 110 through VCU 120, wireless modem 124, wireless carrier system 140, communication network 142, and land network 144 to call center 170.

Figure 2:
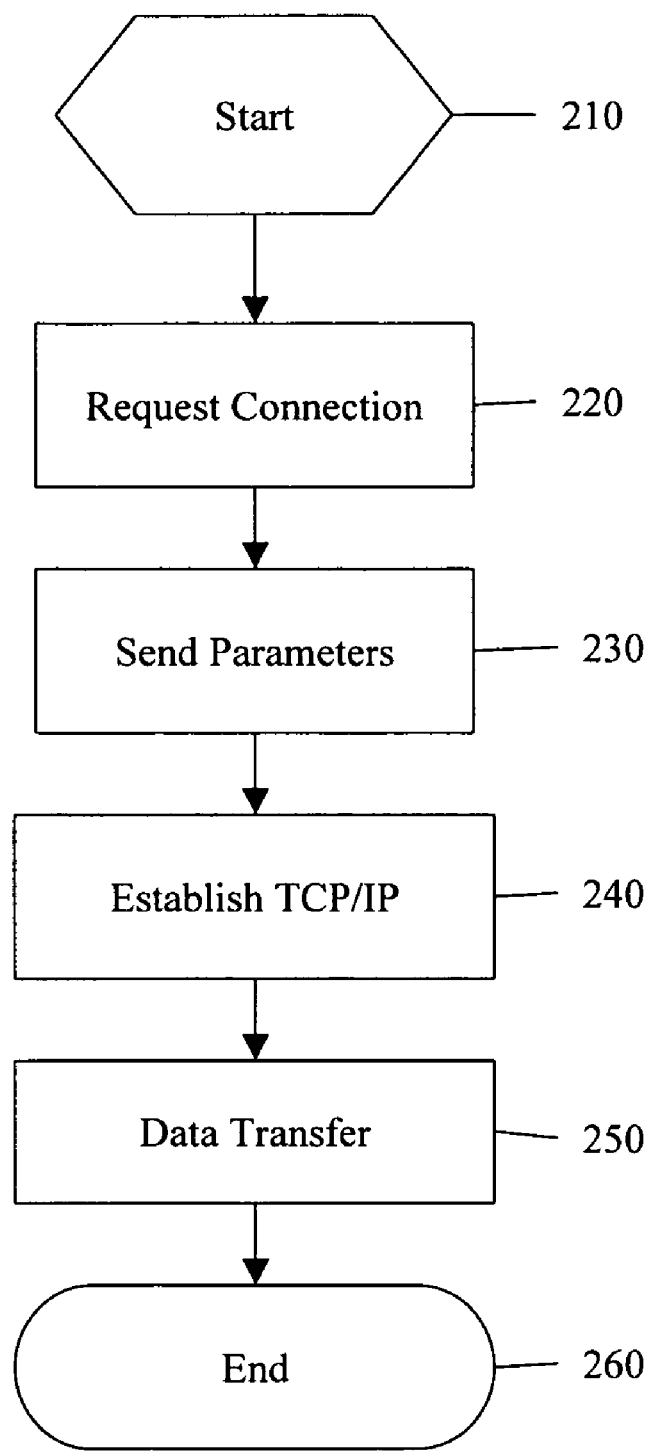
FIG. 2 is a flow chart diagram of a general method for establishing mobile terminated connections with dynamically assigned wireless IP terminals in accordance with one embodiment of the present invention.

FIG. 2 is a flow diagram of a general method for establishing mobile terminated connections with dynamically assigned wireless IP terminals for an embodiment of the present invention.

FIG. 2 shows a general method 200 for establishing a mobile terminated connection between a VCU 120 and a land network 144. Land network 144 is preferably an Internet Protocol network, but any suitable network may be implemented. The method starts at block 210.

Call center 170 issues a request for a wireless connection to be made between VCU 120 and land network 144 at block 220. In one embodiment, the call center 170 requests an IP address and server call in parameters from IP network 144 through web portal 160. In one embodiment, server call in parameters includes a TCP port number parameter, a connection failure timeout parameter, and a service type parameter. The TCP port number is a port number on web server 164. Communication network 142 assigns dynamic IP addresses to terminals of mobile vehicles. The mobile vehicle's terminal is VCU 120. The connection failure timeout parameter specifies how much time elapses during which no data transfer occurs in order for the wireless IP terminal to assume the connection has failed. The service type parameter describes what kind of service is requested. For example, this could be a request to download a certain update to an application, or a request to update a route. In one embodiment, call center 170 accesses land network 144 through web server 164, which is controlled by call center 170 through web portal 160. Call center 170 determines the IP address and server call in parameters through web server 164 in communication with land network 144.

The call center 170 then sends the required IP address and server call in parameters and sends them to vehicle VCU 120 via wireless carrier system 140 at block 230. Wireless carrier system 140 is any available wireless carrier system. In one embodiment, wireless carrier system 140 is a telephony network. In another embodiment, wireless carrier system 140 is an SMS network.

The vehicle communication system 120 receives the required parameters and IP address and establishes a TCP/IP connection to call center 170 through communication network 142 and land network 144, using the provided parameters and IP address, at block 240. In one embodiment, the VCU 120 terminates the connection to call center 170 after the IP address and parameters are received. The vehicle communication system then establishes a TCP/IP connection to a call center 170 server at the specified IP address. In another embodiment, the VCU 120 does not terminate the connection to call center 170 after it has received the IP address and server call in parameters. Instead, a TCP/IP connection is established to the call center 170 server on another channel in parallel with the connection to the call center 170.

After a TCP/IP connection has been established between the VCU 120 and call center 170, data transfer occurs at block 250. Data is transferred from the VCU 120 through land network 144 and vice versa via a wireless carrier system 140. The method stops at block 260.

It should be noted that communication network 142 and land network 144 do not know the IP address for the call center 170 server. Communication network 142 and land network 144 are pass-through networks.

Figure 3:
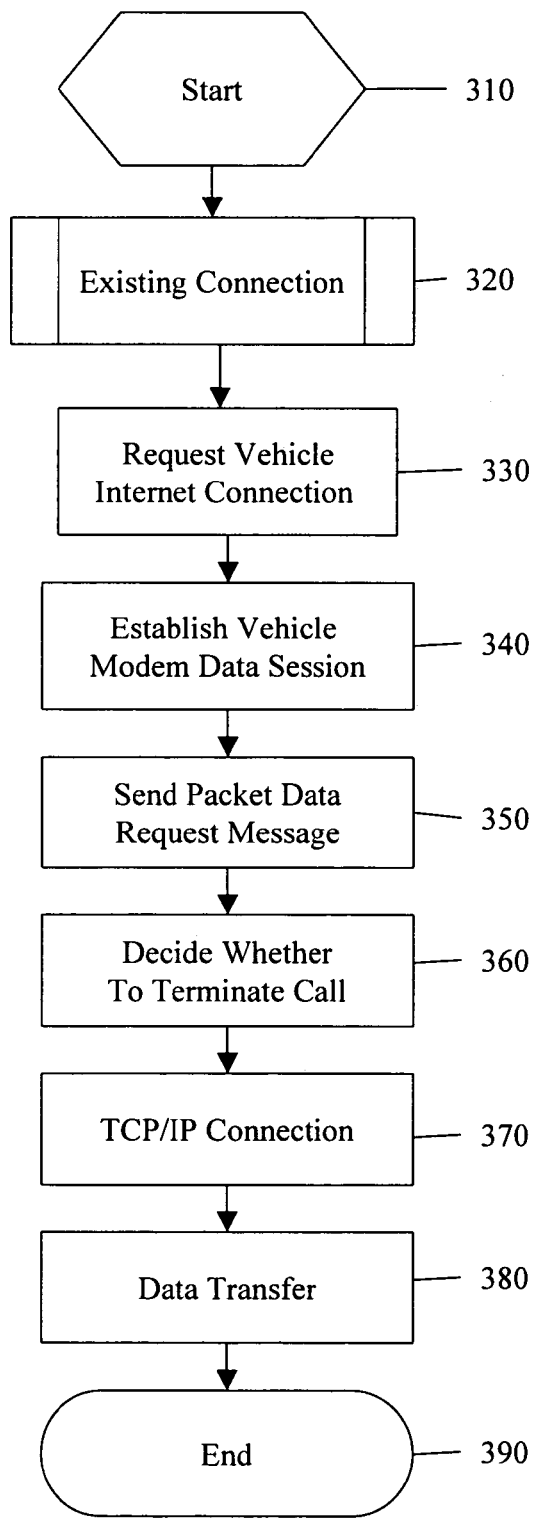
FIG. 3 is a flow chart of one method of establishing a mobile terminated connection with dynamically assigned wireless IP terminals in automotive telematics applications in accordance with one embodiment of the present invention.

FIG. 3 is a flow chart of one method of establishing a mobile terminated connection with dynamically assigned wireless IP terminals in automotive telematics applications.

FIG. 3 describes a method 300 for establishing a mobile terminated connection from an automotive telematics application when a preexisting connection between a call center 170 and VCU 120 is present. The method begins at block 310.

A preexisting connection between mobile vehicle 110 and call center 170 over wireless carrier system 140 exists at block 320. In one embodiment, the preexisting connection is a voice call over modem 124 between mobile vehicle 110 and advisor 178. Mobile vehicle 110 communicates with advisor 178 through the VCU 120. The VCU 120 comprises a telematics unit. Wireless carrier system 140 comprises a telephony network or any wireless system capable of transmitting voice and data communications.

Call center 170 sends a request to web portal 160 for VCU 120 of mobile vehicle 110 to establish a connection to the land network 144 via a wireless carrier system 140 at block 330. In the preferred embodiment, the land network 144 is an Internet Protocol network. The call center 170 requests for a dynamic IP address and server call in parameters be assigned to VCU 120 of mobile vehicle 110 by web server 164. In one embodiment, web server 164 is controlled by call center 170.

The call center 170 then directs vehicle VCU 120 to switch the wireless connection to modem 162 at block 340. Call center 170 sends a request to the VCU 120 on the preestablished connection, which directs the VCU 120 to switch to a data session with modem 162 via wireless carrier system 140.

Call center 170 then sends a request message to connect to the Internet, at block 350, via a wireless carrier system 140, to VCU 120. In one embodiment, the request message includes a command for VCU 120 to establish a TCP/IP packet data connection to the Internet, an IP address, and server call in parameters. In a further embodiment, server call in parameters include a TCP port number, a connection failure timeout parameter, and a service type request. In a preferred embodiment, the wireless carrier system 140 comprises a telephony network. Wireless carrier system 140 can be used to take advantage of the preexisting connection between mobile vehicle 110 and call center 170. In another embodiment, wireless carrier system 140 comprises an SMS network.

After receiving and running the request message, VCU 120 chooses at block 360 whether to terminate the call between VCU 120 and call center 170. In one embodiment, VCU 120 terminates the connection between itself and call center 170 prior to establishing a TCP/IP connection to the call center 170. In another embodiment, VCU 120 does not terminate the connection to call center 170. Instead, VCU 120 opens up a separate connection to connect to the Internet using the IP address and server call in parameters described above.

VCU 120 establishes a packet data TCP/IP connection between itself and land network 144 at block 370. Land network 144 is, in one embodiment, an IP network. VCU 120 utilizes the received server call in parameters and IP address to establish the connection. Server call in parameters and IP address can be used to connect to and log into web server 164.

After the establishment of a TCP/IP connection to the Internet, VCU 120 begins data transmission and reception at block 380. Data can be transmitted from the vehicle 110 to the Internet server 164 or vice versa. Therefore, though the method 300 is originated outside of the mobile vehicle 110, the VCU 120 of the mobile vehicle 110 actually establishes the call to connect to the Internet. The method ends at block 390.

FIG. 4 is a flow chart of another method for establishing a mobile terminated connection with dynamically assigned wireless IP terminals in automotive telematics applications in accordance with one embodiment of the present invention.

FIG. 4 shows a method 400 for establishing a mobile terminated connection from an automotive telematics application when no preexisting connection between a call center 170 and VCU 120 of mobile vehicle 110 is present. The method begins at block 410 when a call center determines that a connection between land network 144 and mobile vehicle 110 is necessary. Land network 144 is, in one embodiment, an IP network.

Call center 170 sends a request, at block 420, to web portal 160, to provide connection parameters for a connection between VCU 120 of mobile vehicle 110 and IP network 144 via a wireless carrier system 140. The call center 170 requests for a dynamic IP address and server call in parameters to be assigned to VCU 120 by web server 164. In one embodiment, web server 164 is controlled by call center 170.

Call center 170 then establishes a connection via a wireless carrier system 140 to VCU 120 at block 430. In a preferred embodiment, the wireless carrier system 140 comprises an SMS network. SMS messages can be broadcast to mobile vehicle 110 without the need for a full two way connection. SMS network 140 can thus be used to benefit from not having to establish a full wireless connection between call center 170 and VCU 120. In another embodiment, wireless carrier system 140 comprises a telephony network.

Call center 170 sends a request message, at block 440, via wireless carrier system 140, to VCU 120. In one embodiment, the request message includes a command for VCU 120 to establish a TCP/IP packet data connection to the Internet, an IP address, and server call in parameters. In a further embodiment, server call in parameters include a TCP port number, a connection failure timeout parameter, and a service type request.

The request from the call center 170 is processed by the VCU 120 at block 450. VCU 120 may already be engaged in communication via a wireless carrier system 140. For example, the user may be utilizing mobile phone 134, or may be connected to a different land network then the one specified for connection by the call center 170. In one embodiment, server call in parameters and IP address are stored until the telematics unit becomes free to establish the requested connection to IP network 144. In another embodiment, server call in parameters and IP address are utilized to establish a connection as soon as the request is received and other ongoing VCU 120 operations are suspended.

VCU 120 establishes a packet data TCP/IP connection between itself and land network 144 at block 460. Land network 144 is preferably an Internet Protocol IP network. VCU 120 utilizes the received server call in parameters and IP address to establish the connection. Server call in parameters and IP address can be used to connect to and log onto the Internet through web server 164. In one embodiment, VCU 120 terminates the connection between itself and call center 170 prior to establishing a TCP/IP connection to the Internet network 144. In another embodiment, VCU 120 does not terminate the connection to call center 170. Instead VCU 120 opens up a separate connection to connect to the Internet using the IP address and server call in parameters as described above.

After the establishment of a TCP/IP connection to the Internet, VCU 120 begins data transmission and reception at block 470. Data can be transmitted from the vehicle 110 to the Internet server 164 or vice versa. Therefore, though the method 400 is originated outside of the mobile vehicle 110, the VCU 120 of the mobile vehicle 110 actually establishes the call to connect to the Internet. The method stops at block 480.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of obtaining an internet connection, the method comprising:

sending an internet connection request from a call center to a vehicle telematics unit, wherein the telematics unit connects to an internet server, controlled by the call center, with the server call in parameters at the provided IP address;

providing an IP address and server call in parameters to the vehicle telematics unit, wherein the server call in parameters comprise:

a TCP port number;

a connection failure timeout; and a service type; and receiving an internet connection at the provided IP address with the server call in parameters from the telematics unit at the call center.

2. The method of claim 1 wherein the internet connection request is provided via telephony.

3. The method of claim 2 wherein the internet connection request is provided via the telephony connection when a preestablished connection exists between the telematics unit and the call center.

4. The method of claim 1 wherein the internet connection request is provided via SMS.

5. The method of claim 4 wherein the internet connection request is provided via SMS when no preestablished connection exists between the telematics unit and the call center.

6. A method for establishing communication between a call center and a vehicle through an IP network, the method comprising the steps of:

obtaining an IP address;

initiating a telephone call to the vehicle;

providing the IP address to the vehicle during the telephone call;

terminating the telephone call to the vehicle; and initiating a packet data connection from the vehicle to the call center using the IP address after telephone call to the vehicle is terminated.

7. A method as set forth in claim 6, wherein the steps of obtaining an IP address and initiating a telephone call to the vehicle are performed by the call center.

8. A method as set forth in claim 6, wherein the steps of obtaining and providing the IP address further comprise obtaining and providing call in parameters to the vehicle.

9. A method as set forth in claim 6, wherein the IP address comprises an IP address for a server at the call center and wherein the step of initiating a packet data connection comprises establishing a packet data connection from the vehicle to the server.

10. A method as set forth in claim 6, including the step of transmitting data bidirectionally after the step of initiating the packet data connection.

11. A method of establishing a packet data connection between a server and vehicle telematics unit, comprising the steps of:

obtaining at a call center an IP address for a server;

sending the IP address from the call center to a vehicle telematics unit during a preliminary communication between the call center and telematics unit;

establishing a primary communication from the vehicle telematics unit to the server as a packet data connection using the IP address of the server; and transmitting data between the vehicle telematics unit and server over the established packet data connection.

12. A method as set forth in claim 11, wherein the preliminary communication is an SMS message.

13. A method as set forth in claim 11, wherein the preliminary communication is a wireless telephone call.

14. A method as set forth in claim 13, wherein the IP address is sent as data over a voice channel during the wireless telephone call between the call center and telematics unit.

15. A method as set forth in claim 11, wherein the sending step further comprises sending server call in parameters from the call center to the vehicle telematics unit during the preliminary communication.

16. A method of processing a request for a mobile terminated packet data connection from a server to a mobile terminal having a dynamically assigned IP address, comprising the steps of:

obtaining an IP address for the server;

providing the IP address of the server to the mobile terminal via a telephone call to the mobile terminal over a wireless communication system;

initiating a packet data connection from the mobile terminal to the server, wherein the mobile terminal has an assigned dynamic IP address and connects to the server over the packet data connection using its assigned dynamic IP address and the IP address of the server; and transmitting data between the mobile terminal and server over the packet data connection.

\* \* \* \* \*